United States Patent
Al-Somani

(10) Patent No.: US 8,804,952 B2
(45) Date of Patent: Aug. 12, 2014

(54) SYSTEM AND METHOD FOR SECURING SCALAR MULTIPLICATION AGAINST DIFFERENTIAL POWER ATTACKS

(71) Applicant: Umm Al-Qura University, Makkah (SA)

(72) Inventor: Turki Faisal Al-Somani, Makkah (SA)

(73) Assignee: Umm Al-Qura University, Makkah (SA)

( * ) Notice: Subject to any disclaimer, the term of this patent is extended or adjusted under 35 U.S.C. 154(b) by 35 days.

(21) Appl. No.: 13/727,556

(22) Filed: Dec. 26, 2012

(65) Prior Publication Data

US 2014/0177824 A1    Jun. 26, 2014

(51) Int. Cl.
    *H04L 9/06*        (2006.01)

(52) U.S. Cl.
    USPC ............... 380/28; 380/30; 380/44; 380/45; 380/46; 380/47; 380/277

(58) Field of Classification Search
    USPC .................................. 380/28, 30, 44–48, 277
    See application file for complete search history.

(56) References Cited

U.S. PATENT DOCUMENTS

| | | | |
|---|---|---|---|
| 6,826,586 B2 | 11/2004 | Chang | |
| 7,853,012 B2 * | 12/2010 | Sarangarajan et al. | 380/28 |
| 7,853,013 B2 * | 12/2010 | Vasyltsov et al. | 380/28 |
| 7,983,415 B2 | 7/2011 | Al-Gahtani et al. | |
| 8,045,705 B2 * | 10/2011 | Antipa et al. | 380/28 |
| 8,369,517 B2 * | 2/2013 | Venelli et al. | 380/30 |
| 2004/0247114 A1 | 12/2004 | Joye | |
| 2007/0098154 A1 | 5/2007 | Antipa et al. | |
| 2008/0019509 A1 | 1/2008 | Al-Gahtani et al. | |
| 2008/0144812 A1 | 6/2008 | Al-Gahtani et al. | |
| 2008/0273695 A1 * | 11/2008 | Al-Gahtani et al. | 380/30 |
| 2008/0301459 A1 * | 12/2008 | Ebeid | 713/180 |
| 2009/0046851 A1 | 2/2009 | Elmegaard-Fessel | |
| 2009/0052657 A1 | 2/2009 | Golic | |
| 2009/0074178 A1 | 3/2009 | Longa | |
| 2009/0180610 A1 | 7/2009 | Tobergte | |

(Continued)

FOREIGN PATENT DOCUMENTS

| | | |
|---|---|---|
| CN | 1806224 A | 7/2006 |
| CN | 101366232 A | 2/2009 |

(Continued)

OTHER PUBLICATIONS

Tetsuya Izu and Tsuyoshi Takagi, "Fast Elliptic Curve Multiplications Resistant against Side Channel Attacks", *IEICE Trans. Fundamentals*, vol. E88-A, No. 1, Jan. 2005.

(Continued)

*Primary Examiner* — Kambiz Zand
*Assistant Examiner* — Tongoc Tran
(74) *Attorney, Agent, or Firm* — Richard C. Litman

(57) ABSTRACT

The system and method for securing scalar multiplication against differential power attacks (DPAs) delays required point additions in elliptic curve cryptosystem scalar multiplication. A buffer is used to store the points that will be added later in a random manner. Then, a randomly selected one of the stored points in the buffer is added to the accumulation point, or several randomly selected points are added consecutively. This makes the power trace appear as a repeated sequence of consecutive point doubling followed by consecutive point additions, which makes it very difficult for an attacker to know the exact value of the inspected bit during the scalar multiplication process.

2 Claims, 1 Drawing Sheet

(56) References Cited

U.S. PATENT DOCUMENTS

| | | |
|---|---|---|
| 2009/0207997 A1 | 8/2009 | Izu et al. |
| 2009/0214023 A1 | 8/2009 | Al-Somani et al. |
| 2009/0214025 A1 | 8/2009 | Golic |
| 2010/0011047 A1* | 1/2010 | Jackson et al. ............... 708/491 |
| 2012/0008780 A1 | 1/2012 | Al-Somani et al. |

FOREIGN PATENT DOCUMENTS

| | | |
|---|---|---|
| JP | 2004177582 A | 6/2004 |
| KR | 20070001376 A | 1/2007 |
| WO | WO 9904332 A1 | 1/1999 |
| WO | WO 2007/048430 A1 | 5/2007 |

OTHER PUBLICATIONS

Christophe Giraud and Vincent Verneuil, "Atomicity Improvement for Elliptic Curve Scalar Multiplication", arXiv:1002.4569v1 [cs.CR] Feb. 24, 2010.

\* cited by examiner

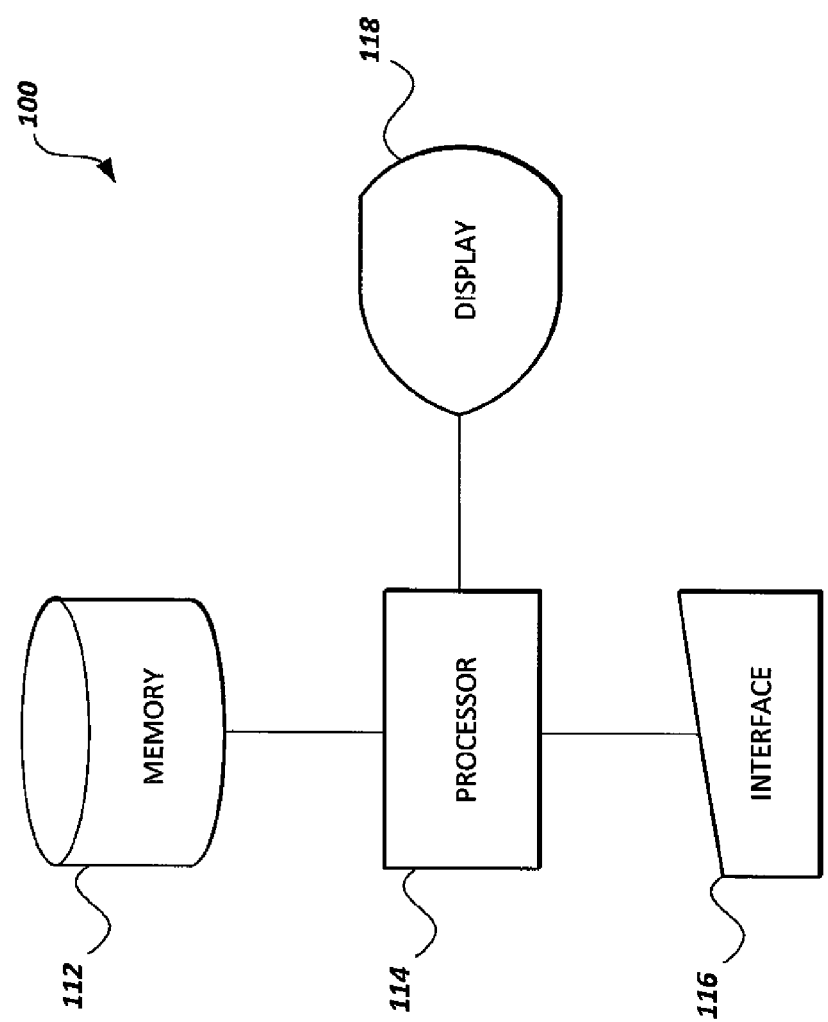

SYSTEM AND METHOD FOR SECURING SCALAR MULTIPLICATION AGAINST DIFFERENTIAL POWER ATTACKS

BACKGROUND OF THE INVENTION

1. Field of the Invention

The present invention relates to cryptography systems and methods, and particularly to a system and method for securing scalar multiplication against differential power attacks.

2. Description of the Related Art

Elliptic Curve Cryptosystems (ECC), originally proposed by Niel Koblitz and Victor Miller in 1985, offer a serious alternative to earlier public key cryptosystems, such as Rivest-Shamir-Adleman (RSA) and ElGamal, with much shorter key size. To date, no significant breakthroughs have been made in determining weaknesses in the ECC algorithm, which is based on the discrete logarithm problem over points on an elliptic curve. The fact that the problem appears so difficult to crack means that key sizes can be reduced considerably, even exponentially. This has caused ECC to become a serious challenger to RSA and ElGamal cryptosystems. Because of these advantages, ECC have been recently incorporated in many standards. ECC have gained popularity for cryptographic applications because of the short key, and are considered to be particularly suitable for implementation on smart cards or mobile devices.

An elliptic curve over a finite field GF(q) defines a set of points (x,y) that satisfy the elliptic curve equation together with the point O, known as the "point at infinity". The "point at infinity" does not satisfy the elliptic curve equation. The coordinates x and y of the elliptic curve points are elements of the field GF(q), where $q=p^m$ and p is prime.

Equations (1) and (2) define the elliptic curve equations for the fields GF(p) and GF($2^m$), respectively:

$$y^2 = x^3 + ax + b \quad (1)$$

where a, b∈GF(p) and $4a + 27b^2 \neq 0 \pmod{p}$; and $$y^2 + xy = x^3 + ax^2 + b \quad (2)$$

where a, b∈GF($2^m$) and b≠0.

The set of discrete points on an elliptic curve form an abelian group (commutative group), whose group operation is known as point addition. Bounds for the number of discrete points n on an elliptic curve over a finite field GF(q) are defined by Hasse's theorem, given in Equation (3), where the symbol n represents the number of points on the elliptic curve and where $q=p^m$ represents the number of elements in the underlying finite field:

$$q + 1 - 2\sqrt{q} \leq n \leq q + 1 + 2\sqrt{q}. \quad (3)$$

Elliptic curve "point addition" is defined according to the "chord-tangent process". Point addition over GF(p) is described as follows: Let P and Q be two distinct points on an elliptic curve E defined over the real numbers with Q≠−P (Q is not the additive inverse of P). The addition of P and Q is the point R=P+Q, where R is the additive inverse of S, and S is a third point on the elliptic curve intercepted by the straight line through points P and Q. For the curve under consideration, R is the reflection of the point S with respect to the x-axis, that is, if R is the point (x,y), then S is the point (x,−y).

When P=Q and P≠−P, the addition of P and Q is the point R, where R=2P and R is the additive inverse of S, and S is the third point on the elliptic curve intercepted by the straight line tangent to the curve at point P. This operation is referred to as "point doubling".

The "point at infinity", O, is the additive identity of the group. The most relevant operations involving O are the following: the addition of a point P and O is equal to P (i.e., P+O=P); and the addition of a point P and its additive inverse, −P, is equal to O (i.e., P−P=O). If P is a point on the curve, then −P is also a point on the curve.

The point operation used by elliptic curve cryptosystems is referred to as point multiplication. This operation is also referred to as scalar point multiplication. The point multiplication operation is denoted as kP, where k is an integer number and P is point on the elliptic curve. The operation kP represents the addition of k copies of point P, as shown in Equation (4) below:

$$kP = \underbrace{P + P + \ldots + P}_{k \text{ times } P}. \quad (4)$$

Elliptic curve cryptosystems are built over cyclic groups. Each group contains a finite number of points, n, that can be represented as scalar multiples of a generator point: iP for i=0, 1, ..., n−1, where P is a generator of the group. The order of point P is n, which implies that nP=O and iP≠−O for 1<i<n−1. The order of each point on the group must divide n. Consequently, a point multiplication kQ for k>n can be computed as (k mod n)Q.

Scalar multiplication is the basic operation for ECC. Scalar multiplication in the group of points of an elliptic curve is the analogue of exponentiation in the multiplicative group of integers modulo a fixed integer m. Computing kP can be performed using a straightforward double-and-add approach based on the binary representation of $k = k_{l-1}, \ldots, k_0$ where $k_{l-1}$ is the most significant bit of k. Other scalar multiplication methods have been proposed in the literature.

One of the simplest scalar multiplication algorithms is the double-and-add point multiplication algorithm, which is the so-called binary algorithm. Algorithm 1 shows a typical double-and-add scalar multiplication algorithm. The algorithm inspects the multiplier k. For each inspected bit, the algorithm performs a point double, and if the inspected bit is one, the algorithm also performs a point add:

---
Algorithm 1: Double-and-Add
---
Inputs: P,k
Output: kP
Initialization:
   Q[0] = 0; Q[1] = P
Scalar Multiplication:
   for i = 0 to m − 1
     if $k_i$ = 1 then Q[0] = ADD(Q[0],Q[1])
     Q[1] = DBL(Q[1])
   end for
return Q[0]
---

In the above algorithm, the "DBL" operation is a simple point doubling operation; e.g., Q[1]=DBL(Q[1]) simply means updating Q[1] as Q[1]=2Q[1]. Similarly, the "ADD" operation is a simple point adding operation; e.g., Q[0]=ADD (Q[0],Q[1]) simply means updating Q[0] as Q[0]=Q[0]+Q [1]. As noted above, kP can be computed using a straightforward binary method based on the binary expression of multiplier k. A conventional prior art scalar multiplication method for elliptic cryptosystems is shown in the U.S. Patent Application Publication US 2009/0214023 A1, which is hereby incorporated by reference in its entirety.

The binary scalar multiplication method shown in Algorithm 1 is the most straightforward scalar multiplication method. It inspects the bits of the scalar multiplier k, and if the inspected bit $k_i=0$, only point doubling is performed. If, however, the inspected bit $k_i=1$, both point doubling and point addition are performed. The binary method requires in point doublings and an average of m/2 point additions.

Power analysis attacks are usually divided into two types: Simple Power Analysis (SPA) attacks and Differential Power Analysis (DPA) attacks. SPA attacks consist of observing the power consumption during a single execution of a cryptographic algorithm. The power consumption analysis may also enable one to distinguish between point addition and point doubling. Differential Power Analysis (DPA) attack combines the SPA attack with an error-correcting technique using statistical analysis. More importantly, classical DPA attacks have been extensively researched for each cryptosystem, and new types of DPA attacks are continuously being developed. Many of the existing countermeasures are vulnerable to the more recent attacks, including the "Doubling Attack", the Refined Power Analysis (RPA) and the Zero-Value Point Analysis (ZVP).

DPA attacks use error-correction techniques and statistical analysis to extract small differences in the power consumption signals. Several countermeasures have been proposed to provide security against DPA attacks, such as utilizing algorithms based on randomizing the private exponent, blinding the base point P, randomizing the projective coordinates, using a random isomorphism of an elliptic curve, and using special forms of certain elliptic curves. All of these countermeasures, however, add computational overhead and are still vulnerable to the more recent DPA attacks, e.g. the Doubling Attack, the Refined Power Analysis (RPA) and the Zero-Value Point (ZVP) attack. It would be desirable to provide an efficient countermeasure against DPA attacks which requires no additional computational overhead.

Thus, a system and method for securing scalar multiplication against differential power attacks solving the aforementioned problems is desired.

SUMMARY OF THE INVENTION

The system and method for securing scalar multiplication against differential power attacks (DPAs) delays required point additions in elliptic curve cryptosystem scalar multiplication. Scalar multiplication is the basic operation for elliptic curve crypto systems (ECCs). Scalar multiplication of a group of points on an elliptic curve is analogous to the exponentiation of a multiplicative group of integers modulo a fixed integer m. The scalar multiplication operation, denoted as kP, where k is an integer and P is a point on the elliptic curve, represents the addition of k copies of point P. Scalar multiplication is then computed by a series of point doubling and point addition operations of the point P that depends on the bit sequence that represents the scalar multiplier k.

In the present method, a buffer is used to store the points that will be added later in a random manner. Randomization is used to confuse the scalar multiplication computation, in addition to confusing the power trace. The present method randomly performs delayed point additions either by adding a randomly selected point from the buffer to the accumulation point, or by adding several randomly selected points from the buffer consecutively. This makes the power trace appear as a repeated sequence of consecutive point doublings, followed by one or consecutive point additions. This makes it very difficult for an attacker to know the exact value of the inspected bit during the scalar multiplication process. The pseudo-code of the method for securing scalar multiplication against differential power attacks is as follows:

```
Inputs: P,k
Output: kP
Initialization:
    Q[0] = 0; Q[1] = P
Scalar Multiplication:
    for i = 0 to m - 1
        set r = random number ≤ the number of stored
                points in the buffer
        if k_i = 1 then
            save Q[1] in the buffer
            while r > 0 do
                Q[0] = ADD(Q[0], a random point from the
                        buffer)
                update the buffer by removing the point that
                    has been added in the previous step
                set r = r - 1
            end while
            if the buffer is full then
                Q[0] = ADD(Q[0], a random point from the
                        buffer)
                update the buffer by removing the point that
                    has been added in the previous step
            end if
            if i = m - 1 then
                while the buffer is not empty do
                    Q[0] = ADD(Q[0], a random point from the
                            buffer)
                    update the buffer by removing the point that
                        has been added in the previous step
                end while
            end if
        end if
        Q[1] = DBL(Q[1])
    end for
    return Q[0]
```

The above is a method for securing elliptic curve scalar multiplication of a private key k with a point P against differential power attacks using a cryptographic device. A physical, non-transitory buffer memory is first established, followed by the precomputation of a plurality of points Q[i] on an elliptic curve, where i is an integer. Then, the private key k is partitioned into m bits, where in is an integer, such that $k = (k_{m-1}, \ldots, k_0)$. The method is of general application, and may be used wherever it is necessary to perform scalar multiplication, including public-key exchange, digital signatures, message encryption and decryption, etc.

These and other features of the present invention will become readily apparent upon further review of the following specification and drawings.

BRIEF DESCRIPTION OF THE DRAWINGS

The sole drawing FIGURE is a block diagram illustrating system components of a system for implementing the method for securing scalar multiplication against differential power attacks.

Similar reference characters denote corresponding features consistently throughout the attached drawings.

DETAILED DESCRIPTION OF THE PREFERRED EMBODIMENTS

The system and method for securing scalar multiplication against differential power attacks (DPAs) delays required point additions in elliptic curve cryptosystem scalar multiplication. Scalar multiplication is the basic operation for elliptic curve cryptosystems (ECCs). Scalar multiplication of a group of points on an elliptic curve is analogous to the exponentiation of a multiplicative group of integers modulo a fixed integer m. The scalar multiplication operation, denoted as kP, where k is an integer and P is a point on the elliptic curve, represents the addition of k copies of point P. Scalar multiplication is then computed by a series of point doubling and point addition operations of the point P that depends on the bit sequence that represents the scalar multiplier k.

In the present method, a buffer is used to store the points that will be added later until the buffer is full or the last bit of the multiplier k is inspected. Then, the stored points in the buffer are added to the accumulation point. The same procedure is repeated whenever the buffer is full again. This makes the power trace appears as a repeated sequence of consecutive point doubling followed by consecutive point additions. This makes it very difficult for an attacker to know the exact value of the inspected bit during the scalar multiplication process. The pseudo-code of the method for securing scalar multiplication against differential power attacks is given below in Algorithm 2:

---

Algorithm 2: Randomized Double-And-Delayed Add

```
Inputs: P,k
Output: kP
Initialization:
    Q[0] = 0; Q[1] = P
Scalar Multiplication:
    for i = 0 to m − 1
        set r = random number ≤ the number of stored
                points in the buffer
        if k_i = 1 then
            save Q[1] in the buffer
            while r > 0 do
                Q[0] = ADD(Q[0], a random point from the
                        buffer)
                update the buffer by removing the point that
                    has been added in the previous step
                set r = r − 1
            end while
            if the buffer is full then
                Q[0] = ADD(Q[0], a random point from the
                        buffer)
                update the buffer by removing the point that
                    has been added in the previous step
            end if
            if i = m − 1 then
                while the buffer is not empty do
                    Q[0] = ADD(Q[0], a random point from the
                            buffer)
                    update the buffer by removing the point that
                        has been added in the previous step
                end while
            end if
        end if
        Q[1] = DBL(Q[1])
    end for
    return Q[0]
```

---

The above is a method for securing elliptic curve scalar multiplication of a private key k with a point P against differential power attacks using a cryptographic device. A physical, non-transitory buffer memory is first established, followed by the precomputation of a plurality of points Q[i] on an elliptic curve, where i is an integer. Then, the private key k is partitioned into m bits, where m is an integer, such that k=$(k_{m-1}, \ldots, k_0)$. The method is of general application, and may be used wherever it is necessary to perform scalar multiplication, including public-key exchange, digital signatures, message encryption and decryption, etc.

It should be understood that the calculations may be performed by any suitable computer system, such as that diagrammatically shown in the sole FIGURE. Data is entered into the system 100 via any suitable type of user interface 116, and may be stored in memory 112, which may be any suitable type of computer readable and programmable memory, preferably in the form of non-transitory storage media. Calculations are performed by a processor 114, which may be any suitable type of computer processor, and may be displayed to the user on display 118, which may be any suitable type of computer display.

The processor 114 may be associated with, or incorporated into, any suitable type of computing device, for example, a personal computer or a programmable logic controller. The display 118, the processor 114, the memory 112 and any associated computer readable recording media are in communication with one another by any suitable type of data bus, as is well known in the art.

Examples of computer-readable recording media include a magnetic recording apparatus, an optical disk, a magneto-optical disk, and/or a semiconductor memory (for example, RAM, ROM, etc.), or any other form of non-transitory computer readable media. Examples of magnetic recording apparatus that may be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

The method is of general application, and may be used wherever it is necessary to perform scalar multiplication, including public-key exchange, digital signatures, message encryption and decryption, etc. The present method requires m point doublings and an average of m/2 point additions. This performance improves to m point doublings and an average of m/3 point additions when non-adjacent form (NAF) encoding is used. The method requires no extra dummy computations to secure scalar multiplication against DPA attacks.

The security of the present method depends on the confusion level that could be reached by using the buffer. If the buffer size is very large, the method will perform all of the doublings and then all of the additions, which makes it impossible for the attacker to infer the key. A moderate buffer size should be on the order of $\log_2(m)$ to reach a confusion level that secures scalar multiplication against DPA attacks. Using the present method, an attacker will be confused with leaked information in such a randomized environment. The resistance measures depend on confusing not only the scalar multiplication's intermediate values, but also the key bit positions. Thus, even if leaked information can identify the type of performed operation (e.g., point doubling or point addition), attackers can neither be sure of the corresponding key bit value nor its position.

It is to be understood that the present invention is not limited to the embodiments described above, but encompasses any and all embodiments within the scope of the following claims.

I claim:

1. A method for securing elliptic curve scalar multiplication of a private key k with a point P against differential power attacks using a cryptographic device, comprising the steps of:
    establishing buffer memory;
    precomputing a plurality of points Q[i] on an elliptic curve, wherein i is an integer;
    partitioning the private key k into m bits, wherein m is an integer, such that k=$(k_{m-1}, \ldots, k_0)$;
    for each of the partitions, for i=0 to m−1, and if $k_i$=1, performing scalar multiplication as:
        defining a random number r, wherein r is less than or equal to a number of points stored in the buffer memory;
        saving Q[1] in the buffer memory;

if r is greater than zero, then:
  (a) updating Q[0] by adding a randomly selected point from the buffer memory to Q[0];
  (b) updating the buffer memory by removing the point added to Q[0] in (a) from the buffer memory;
  (c) updating r as r=r−1; and
  (d) repeating (a) through (c) while r is greater than zero;
if the buffer memory is full, then:
  updating Q[0] by adding a randomly selected point from the buffer memory to Q[0];
  updating the buffer memory by removing the point added to Q[0] in the immediately preceding step from the buffer memory;
if i=m−1, then:
  (e) if the buffer memory is not empty, updating Q[0] by adding a point randomly selected from the buffer memory to Q[0];
  (f) updating the buffer memory by removing the point added to Q[0] in (e) from the buffer memory;
  (g) repeating (e) and (f) until the buffer memory is empty;
updating Q[1] by point doubling of Q[1];
setting a scalar product kP equal to Q[0]; and
displaying the scalar product kP.

2. A computer software product that includes a non-transitory storage medium readable by a processor, the non-transitory storage medium having stored thereon a set of instructions for securing elliptic curve scalar multiplication of a private key k with a point P against simple power attacks using a cryptographic device, the instructions comprising:

(a) a first set of instructions which, when loaded into main memory and executed by the processor, causes the processor to establish buffer memory;

(b) a second set of instructions which, when loaded into main memory and executed by the processor, causes the processor to precompute a plurality of points Q[i] on an elliptic curve, wherein i is an integer;

(c) a third set of instructions which, when loaded into main memory and executed by the processor, causes the processor to partition the private key k into m bits, wherein m is an integer, such that $k=(k_{m-1}, \ldots, k_0)$;

(d) a fourth set of instructions which, when loaded into main memory and executed by the processor, causes the processor to define a random number r, wherein r is less than or equal to a number of points stored in the buffer memory;

(e) a fifth set of instructions which, when loaded into main memory and executed by the processor, causes the processor to save Q[1] in the buffer memory if $k_i=1$;

(f) a sixth set of instructions which, when loaded into main memory and executed by the processor, causes the processor, if r is greater than zero and if $k_i=1$, to:
  (i) update Q[0] by adding a randomly selected point from the buffer memory to Q[0];
  (ii) update the buffer memory by removing the point added to Q[0] in (i) from buffer memory;
  (iii) update r as r=r−1, and
  (iv) repeat (i) through (iii) while r is greater than zero;

(g) a seventh set of instructions which, when loaded into main memory and executed by the processor, causes the processor to, if the buffer memory is full, update Q[0] by adding a randomly selected point from the buffer memory to Q[0] and then update the buffer memory by removing the point added to Q[0] from the buffer memory;

(h) an eighth set of instructions which, when loaded into main memory and executed by the processor, causes the processor to, if i=m−1, update Q[0] by adding a point randomly selected from the buffer memory to Q[0] and update the buffer memory by removing the point added to Q[0] from the buffer memory while the buffer memory is not empty;

(i) a ninth set of instructions which, when loaded into main memory and executed by the processor, causes the processor to update Q[1] by point doubling of Q[1];

(j) a tenth set of instructions which, when loaded into main memory and executed by the processor, causes the processor to set a scalar product kP equal to Q[0]; and (k) an eleventh set of instructions which, when loaded into main memory and executed by the processor, causes the processor to display the scalar product kP.

* * * * *